Oct. 15, 1935.  F. H. SODEN  2,017,261
METHOD OF SECURING AN EYEGLASS LENS TO ITS SUPPORT
Filed Oct. 15, 1934

INVENTOR
Fred H. Soden
Harold E. Stonebraker
ATTORNEY

Patented Oct. 15, 1935

2,017,261

UNITED STATES PATENT OFFICE 2,017,261

METHOD OF SECURING AN EYEGLASS LENS TO ITS SUPPORT

Fred H. Soden, Rochester, N. Y., assignor to Continental Optical Company, Inc., Rochester, N. Y., a corporation of Indiana Application October 15, 1934, Serial No. 748,324

1 Claim. (Cl. 88—47)

My invention relates to a method of securing an eyeglass lens to its support, and has more particularly to do with the rimless type of eyeglasses in which the lens is secured at its ends to a center and end piece respectively.

A purpose of the invention is to afford an economical, practical and efficient method by which the lens may be secured to its supports by a soldered connection between the pin and the support instead of by the conventional screw-threaded connection.

More particularly the invention has for its purpose to afford a procedure by which a lens may be quickly and readily secured in place by a soldered joint that holds the pin rigidly and permanently in the support, without danger of its becoming accidentally loosened, as is the case with a screw-threaded connection.

Another purpose of the invention is to improve the soldered connections heretofore proposed for this purpose by affording a method that enables assembling the lens in its support quickly and accurately, and insures a firm, rigid, and permanent connection between the parts that hold the lens.

To these and other ends, the invention consists in the method that will appear clearly from the following description when read in conjunction with the accompanying drawing, the novel features being pointed out in the claim following the description.

In the drawing, in which the parts are shown several times their actual size:

Figure 1:
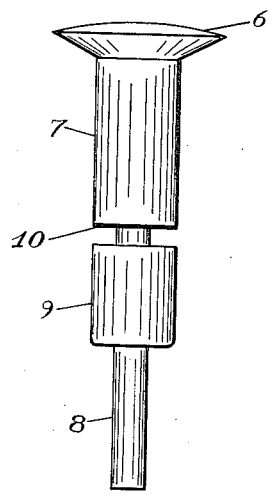
Fig. 1 is a view in side elevation of a pin and solder body made in accordance with a preferred embodiment of the invention.

Referring more particularly to the drawing, in which like reference numerals refer to the same parts throughout the several views, the invention is illustrated in conjunction with a conventional type of lens support, or strap, including upper and lower arms 1 and 2 between which is secured a lens 3.

The upper arm 1 has a recess or seat 4 to receive the head of the attaching pin, and the lower arm has a threaded opening 5 which in the present procedure receives the soldering medium that fills the space between the attaching pin and the threaded surface. The opening 5 does not necessarily have to be threaded but may be otherwise formed to afford a bond between the solder and the pin.

Figure 2:
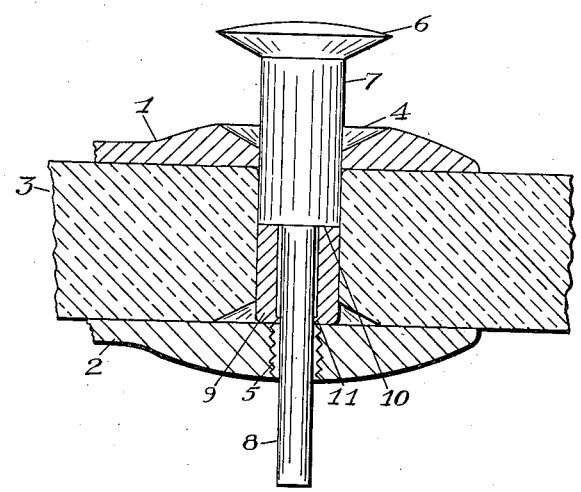
Fig. 2 is a sectional view showing the conventional lens and lens support or strap, and the initial position of the pin and solder body when inserted.

The pin employed for securing the lens between the arms of the support or strap includes a head 6 which engages the seat 4 when the pin is in its final position, and an enlarged or body portion 7 that is of a size to fit snugly within the opening in the lens and likewise the opening in the upper arm 1. Beyond the enlarged or body portion 7, the pin includes a reduced end portion 8 preferably formed integral with the body portion, while 9 is a body of suitable solder designed to occupy the space around the pin and within the lens opening in the manner shown in Fig. 2 when the pin is first inserted. At this time, the body of solder engages against the inner surface of the lower arm 2 and against the shoulder 10 afforded by the inner end of the body portion 7 of the pin.

The body of solder is preferably in the form of a sleeve that is inserted over the reduced end 8 of the pin and slidable thereon. Preferably the solder sleeve 9 has its opening slightly reduced at one end as designated at 11, so as to crowd against the pin slightly and maintain a frictional engagement therewith. As a result of this arrangement, the solder sleeve can be readily moved along the pin if desired but is held against free movement thereon, and cannot accidentally slide from the pin while being inserted into the mounting.

The pin, with the solder sleeve 9 thereon as illustrated in Fig. 1, is preferably furnished to the optician in this form, and when a lens is to be secured in a support, a suitable soldering flux is applied to the reduced end 8 of the pin and to the opening and inner surface of the lower arm 2. After the lens is positioned with its opening concentric with the openings in the arms of the support or strap, the pin is inserted in the manner shown in Fig. 2 and pushed downwardly until the solder sleeve is forced against the inner surface of the lower arm 2.

Figure 3:
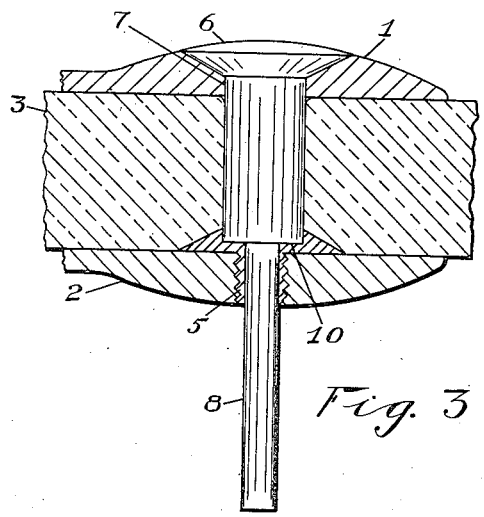
Fig. 3 is a view similar to Fig. 2 showing the position of the pin and solder after the latter has been melted and the pin forced downwardly.

Thereupon, by means of any suitable form of solder pliers, or other instrument or machine adapted for the purpose, heat is applied to the solder ring 9 to melt it and at the same time pressure is applied between the top of the pin and the lower arm 2 so as to force the pin downwardly through the lower arm 2 under considerable pressure. This movement of the pin takes place at the instant the solder is melted, and the shoulder 10, or inner end of the body portion 7 of the pin forces the melted solder in advance of it downwardly into the threaded opening 5 around the reduced end portion of the pin and also into the space between the inner surface of the arm 2 and the shoulder 10, and around the inner end of the body portion 7 of the pin, as shown in Fig. 3.

Figure 4:
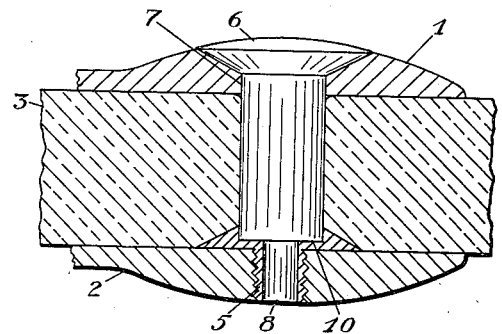
Fig. 4 is a sectional view of the finished construction.

After the solder is cooled and hardened, the portion of the reduced end 8 protruding beyond the support 2 is cut off by any suitable instrument, leaving the finished structure shown in Fig. 4. It will be seen that the procedure affords a rigid and permanent connection between the lower arm 2 and the reduced portion 8 of the pin within the opening of the arm, and also a similar rigid connection between the inner end of the enlarged body portion of the pin and the adjacent inner surface of the arm 2. By having the solder element in the form of a sleeve mounted upon the reduced portion 8 of the pin, the structure can be readily assembled and the operator encounters no difficulty in properly inserting the pin through the lens and support with the solder in the proper and most effective position for bringing about a perfect union of the parts.

Where the term "solder" is used throughout the specification and claim, it is to be understood as comprehending any metallic solder or other fusible or meltable cementitious or binding substance capable of uniting two metallic surfaces when fused.

While the invention has been described with reference to a particular procedure, it is not confined to the precise disclosure herein set forth, and this application is intended to cover such modifications or departures as may come within the spirit of the improvement or the scope of the following claim.

I claim:

The method of securing an eyeglass lens having a pin-receiving opening between the arms of a support, said arms having pin-receiving openings, which consists of forming a pin with a cylindrical body portion and a reduced end portion, positioning a sleeve of solder around said reduced end portion of the pin, inserting the pin carrying the sleeve of solder through the openings in said arms and lens with the cylindrical body portion of the pin closely fitting the opening in the lens and the reduced end portion being spaced from the wall of the surrounding opening in the lower arm and the sleeve of solder located between the lower arm and the end of the cylindrical body portion of the pin, then melting the solder and applying pressure to force the arms together and to force the pin and solder through the lens opening and toward the lower arm of the support, causing the solder to fill the opening in the lower arm around the reduced end portion of the pin.

FRED H. SODEN.